United States Patent [19]

Rosenacker

[11] 4,081,205
[45] Mar. 28, 1978

[54] DISPLAY CART ASSEMBLY

[75] Inventor: Arthur F. Rosenacker, Cincinnati, Ohio

[73] Assignee: Consolidated Foods Corporation, Chicago, Ill.

[21] Appl. No.: 760,530

[22] Filed: Jan. 19, 1977

[51] Int. Cl.² .................... A47B 55/00; A47B 71/00
[52] U.S. Cl. ............................ 312/250; 296/1 R; 312/237; 312/264
[58] Field of Search .............. 312/250, 237, 140.1, 312/140.2, 264, 265; 280/33.99 A, 33.99 F, 33.99 S; 296/1 R, 21; 40/308

[56] References Cited

U.S. PATENT DOCUMENTS

| 1,932,890 | 10/1933 | Grondahl | 40/308 |
| 1,962,454 | 6/1934 | Meanor et al. | 312/250 |
| 2,094,522 | 9/1937 | Blake | 312/250 X |
| 2,845,731 | 8/1958 | Gaborsky, Jr. | 40/308 |
| 3,024,554 | 3/1962 | Kempmer | 40/308 |
| 3,028,066 | 4/1962 | Bumby | 280/33.99 F |
| 3,088,236 | 5/1963 | Hendrick | 40/308 |
| 3,260,561 | 12/1966 | Traktman | 312/264 |
| 3,609,893 | 10/1971 | Routzamn et al. | 40/308 |

FOREIGN PATENT DOCUMENTS

| 2,408,346 | 9/1975 | Germany | 40/308 |

*Primary Examiner*—Robert L. Wolfe
*Assistant Examiner*—A. Grosz
*Attorney, Agent, or Firm*—James W. Pearce; Roy F. Schaeperklaus

[57] ABSTRACT

A display cart assembly which is built on and supported by a shopping cart. Upright side panels are releasably supported on opposite sides of a basket of the shopping cart. Upright end panels span opposed end portions of the side panels. A container is mounted between the side panels. A chamber of the container extends into the interior of the basket and can contain ice for refrigerating food articles in the chamber. Springs connect the side panels to urge the side panels against the end portions. Other springs link each of the side panels with one of the end panels to hold the side panels in engagement with that one of the end panels.

2 Claims, 24 Drawing Figures

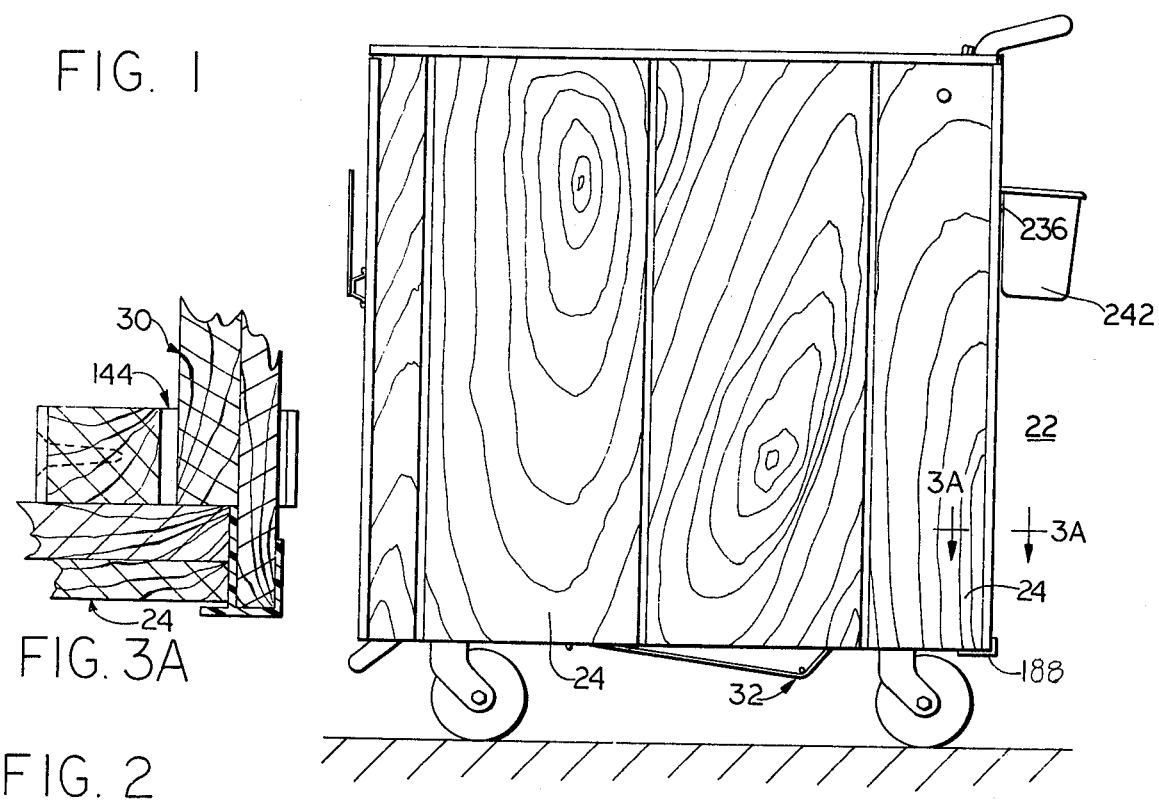
FIG. 1
FIG. 3A
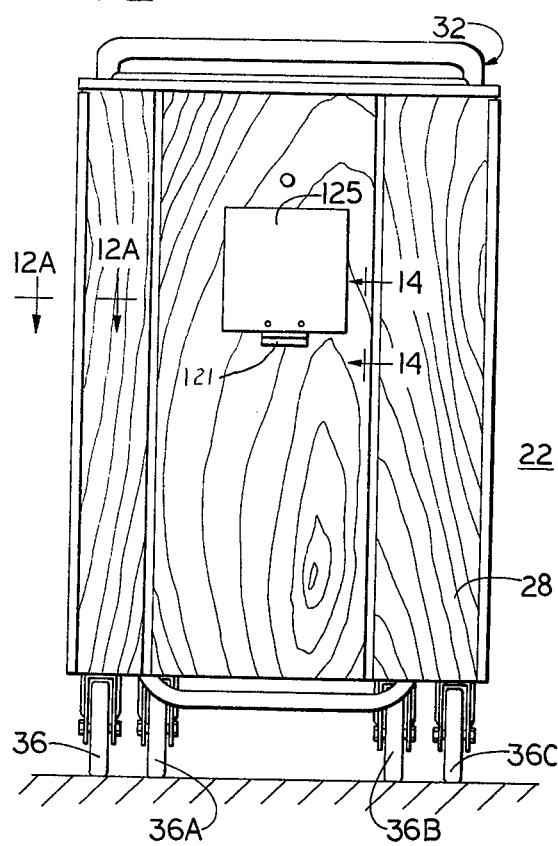
FIG. 2
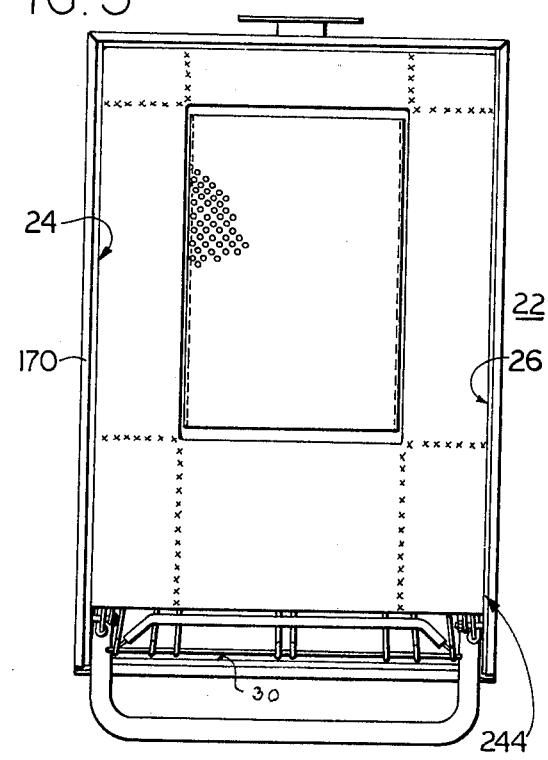
FIG. 3

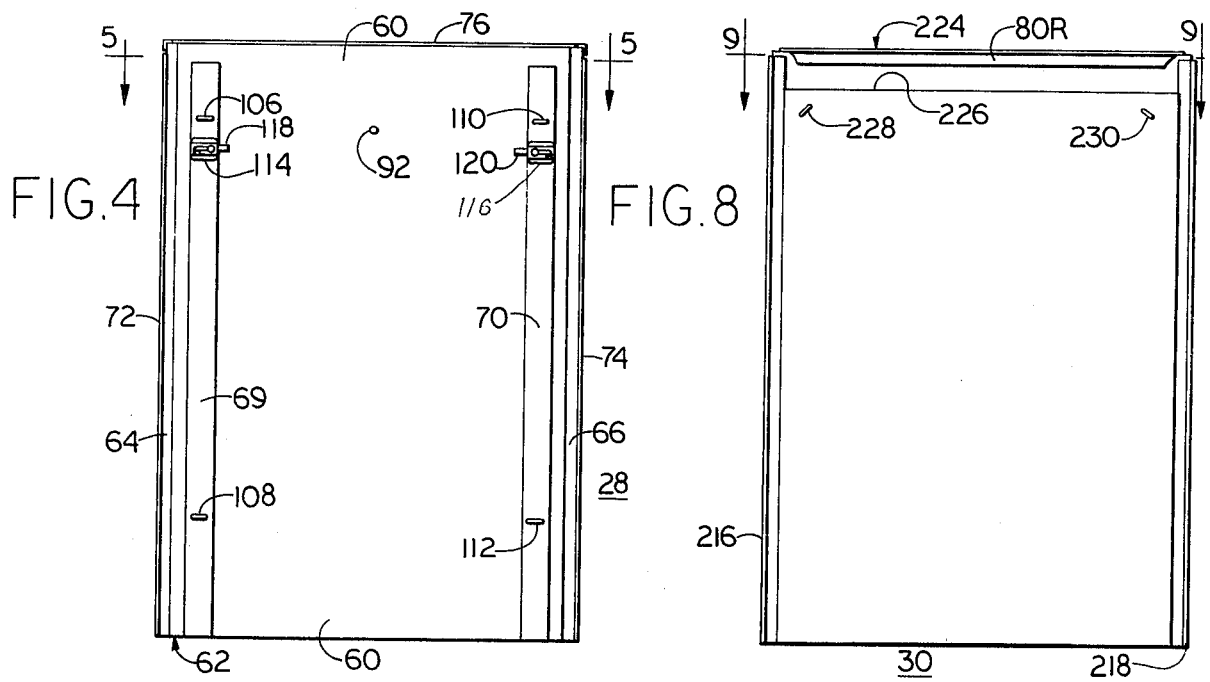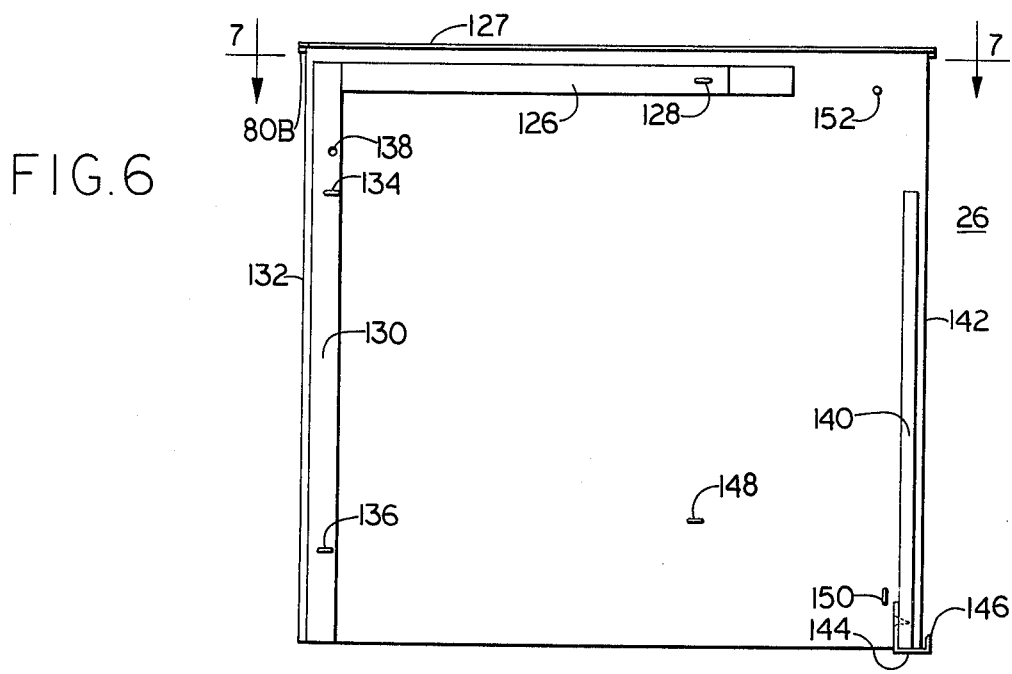

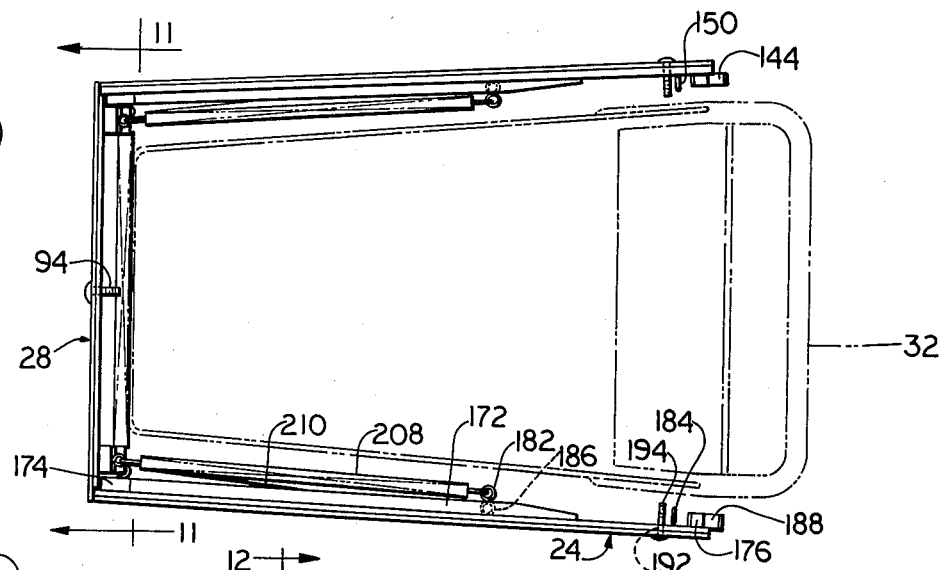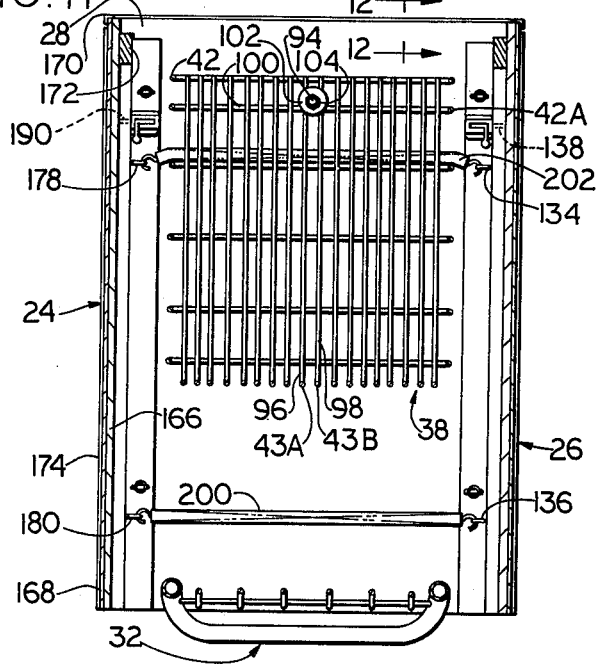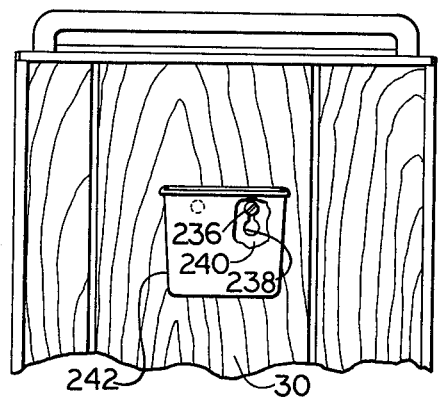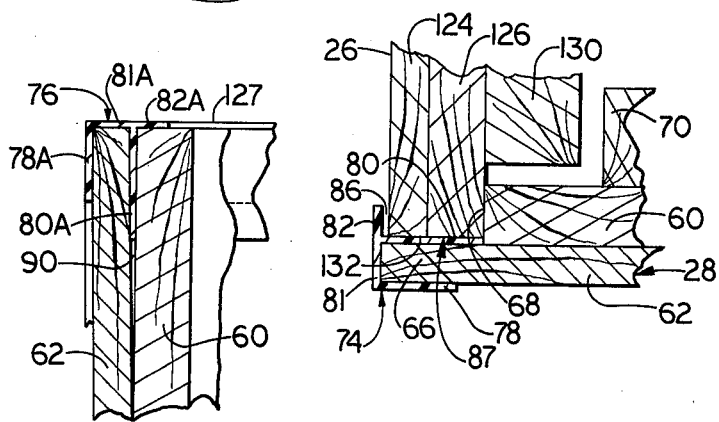

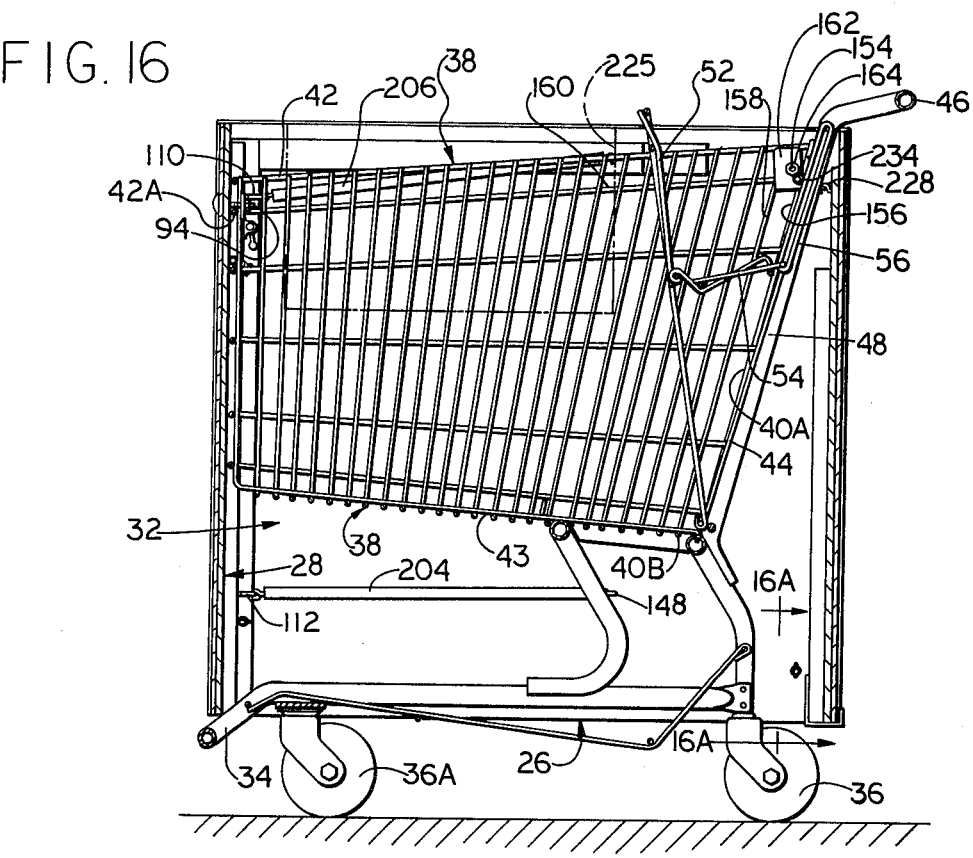
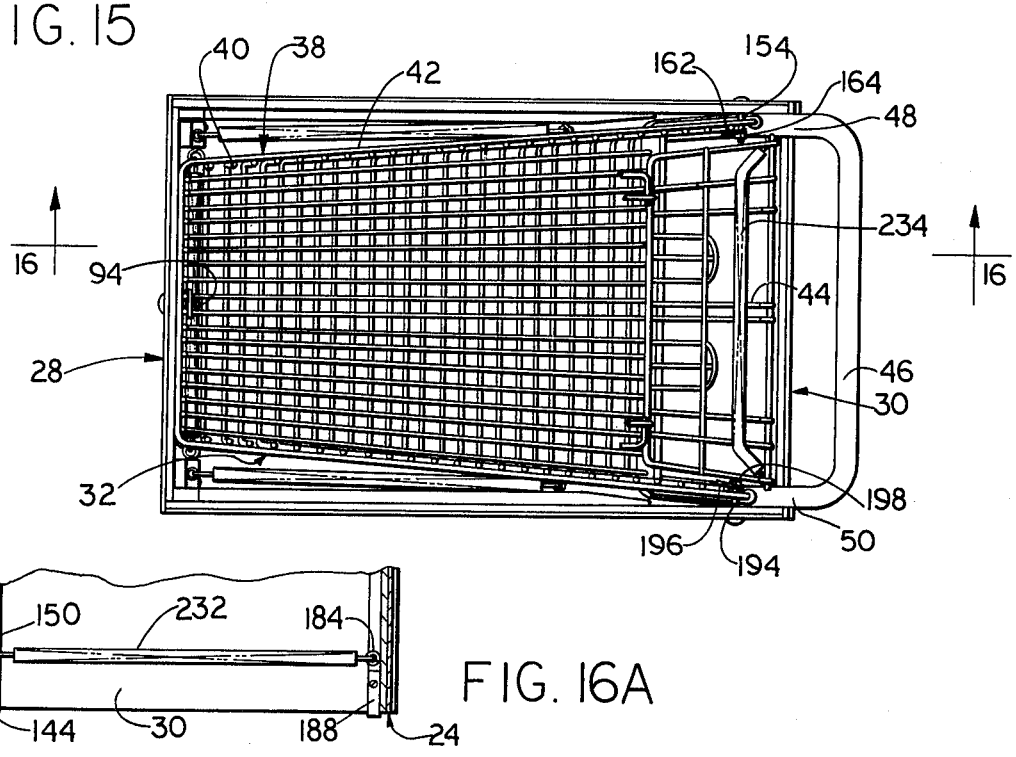

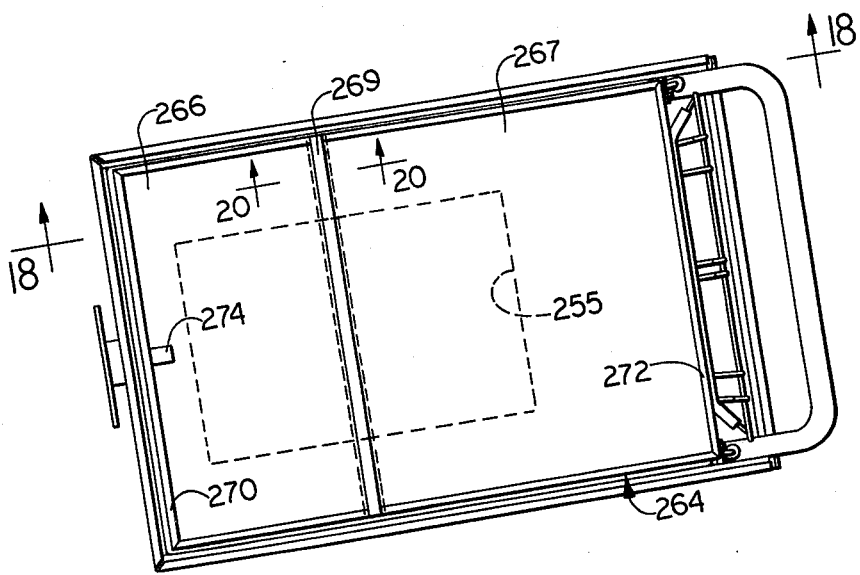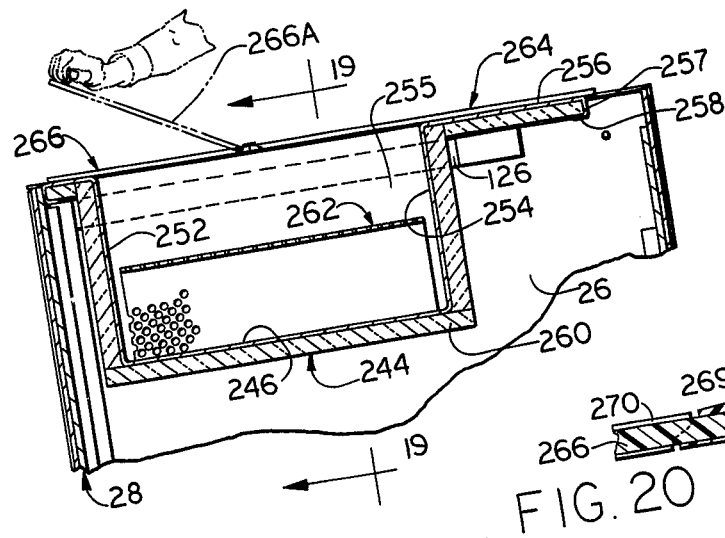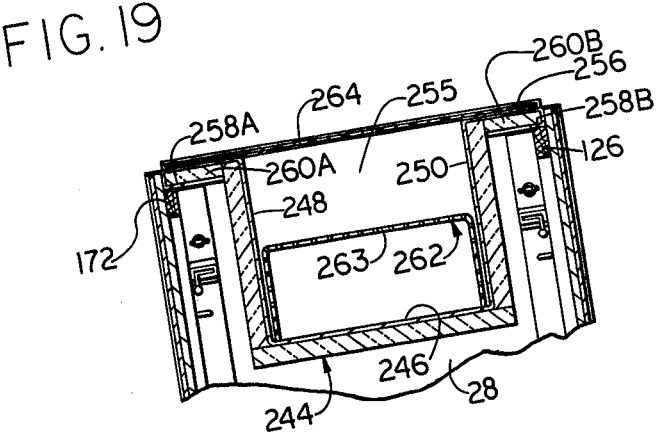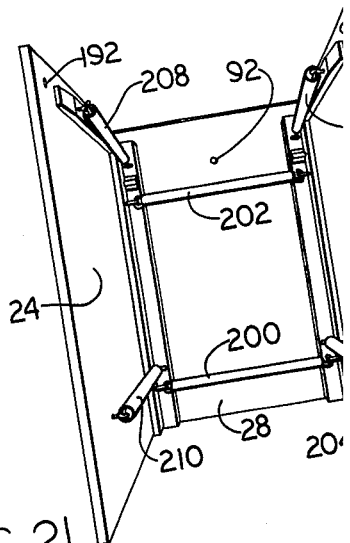

DISPLAY CART ASSEMBLY

This invention relates to a display cart assembly. More particularly, this invention relates to a refrigerated cart assembly which is built around and supported by a shopping cart.

An object of this invention is to provide a framework which can be mounted on a conventional shopping cart and which supports a refrigerated compartment.

A further object of this invention is to provide such a framework which is removably mounted on the shopping cart and which includes horizontal members which support the refrigerated compartment in a horizontal position.

A further object of this invention is to provide such a framework which can be disassembled into a group of panels which can readily be carried in an automobile or the like.

A further object of this invention is to provide such a framework which can be assembled on a shopping cart at a grocery store or the like and which supports a refrigerated compartment in which food items can be displayed for sale as the shopping cart and framework together with a refrigerated compartment supported thereon are rolled around the grocery store.

Briefly, this invention provides a framework made up of panels which surround and are supported on a shopping cart. Mounting members carried by side panels and one end panel are mounted in side panels and an end panel of a basket of the shopping cart. The other end panel is supported on the side panels. Tension springs hold the side and end panels in assembled relation. Horizontal supports attached to the side panels support a refrigerated compartment in a horizontal position. Ice can be disposed in the refrigerated compartment to cool food items carried in the refrigerated compartment.

The above and other objects and features of the invention will be apparent to those skilled in the art to which this invention pertains from the following detailed description and the drawings, in which:

FIG. 1 is a view in side elevation of a refrigerated cart assembly constructed in accordance with an embodiment of this invention, a cover therefor being removed;

FIG. 2 is a view in end elevation of the cart assembly shown in FIG. 1;

FIG. 3 is a top plan view of the cart assembly illustrated in FIGS. 1 and 2;

FIG. 3A is a view in section taken on an enlarged scale on the line 3A—3A in FIG. 1;

FIG. 4 is a view in end elevation of a front end panel of the cart assembly;

FIG. 5 is a view in section taken on the line 5—5 in FIG. 4, side moldings being omitted;

FIG. 6 is a view in side elevation of a side panel of the cart assembly;

FIG. 7 is a view in section taken on the line 7—7 in FIG. 6;

FIG. 8 is a view in end elevation of a rear end panel of the cart assembly;

FIG. 9 ia a view in section taken on the line 9—9 in FIG. 8, side moldings being omitted;

FIG. 10 is a top plan view of the side panels and the front end panel of the cart assembly in partly assembled relation, a shopping cart being shown in dot-dash lines in association therewith;

FIG. 11 is a view in section taken on the line 11—11 in FIG. 10, portions of the shopping cart being shown in full lines;

FIG. 12 is a view in section taken on an enlarged scale on the line 12—12 in FIG. 11;

FIG. 12A is a view in section taken on an enlarged scale on the line 12A—12A in FIG. 2;

FIG. 13 is a fragmentary view in rear elevation of the cart assembly, a portion of an end panel of a waste container being broken away to show details of mounting thereof;

FIG. 14 is a fragmentary view in section taken on an enlarged scale on the line 14—14 in FIG. 2;

FIG. 15 is a top plan view of the refrigerated cart assembly with a refrigerated compartment removed, edge moldings, caster wheels, cross frames and portions of a seat support frame and a seat panel being omitted for clarity;

FIG. 16 is a view in section taken on the line 16—16 in FIG. 15, the edge moldings being in place, the position of a refrigerated chamber being shown in dot-dash lines;

FIG. 16A is a view in section taken on the line 16A—16A in FIG. 16;

FIG. 17 is a top plan view of the refrigerated cart assembly with a cover overlying the refrigerated compartment;

FIG. 18 is a fragmentary view in section taken on the line 18—18 in FIG. 17, a releasable section of the cover being shown in raised position in double-dot-dash lines, springs and spring supports being omitted for clarity;

FIG. 19 is a view in section taken on the line 19—19 in FIG. 18;

FIG. 20 is a view in section taken on an enlarged scale on the line 20—20 in FIG. 17; and FIG. 21 is a schematic perspective view of side panels and an end panel of the cart assembly before mounting.

In the following detailed description and the drawings, like reference characters indicate like parts.

In FIGS. 1—3 inclusive is shown a refrigerated cart assembly 22 constructed in accordance with an embodiment of this invention. The refrigerated cart assembly includes side panels 24 and 26, a front end panel 28 and a rear panel 30, all of which are supported on a cart structure 32.

The cart structure 32 can be a conventional shopping cart of the type used in grocery stores and the like. The cart structure 32, as shown in FIGS. 15 and 16, includes a framework 34 supported on caster wheels 36, 36A, 36B and 36C (FIG. 2). A basket 38 (FIGS. 15 and 16) is supported on the framework 34. The basket 38 is constructed of a plurality of upright U-shaped wire members 40, a plurality of horizontal U-shaped wire members 42, and a plurality of angle-shaped wire members 43 which are welded or otherwise rigidly attached together. Upright rear wire members 44 close a rear end of the basket 38. A transverse handle 46 spans rear frame members 48 and 50 and extends upwardly above the rear portion of the basket 38. A seat support frame 52 is pivotally mounted inside the basket 38. A seat bottom panel 54 is pivotally connected to the seat support frame 52 and slidably mounted in upright guides 56. The shopping cart structure can be of conventional construction.

As shown in FIGS. 4 and 5, the front end panel 28 has a body which includes a base ply 60 and a facing ply 62 laminated to the base ply 60. The base ply 60 and the facing ply 62 are both rectangular in shape, but upright edge portions 64 and 66 of the facing ply 62 extend outwardly of side edges 67 and 68, respectively, of the base ply 60. Upright frame bar members 69 and 70 are attached to an inner wall of the base ply 60 closely spaced from and parallel to the upright edge portions 64 and 66, respectively. Upright edge moldings 72 and 74 are mounted on the upright edge portions 64 and 66 of the body of the front end panel 28. A top edge molding 76 is mounted on a top edge of the body of the front end panel 28. As shown in FIG. 12A, the upright edge molding 74 includes parallel flanges 78 and 80 which engage and grip the upright edge portion 66. The flanges 78 and 80 are joined by a web portion 81. A flange 82 of the upright edge molding 74, which is aligned with the web portion 81, is parallel to and spaced from the side edge 68 of the base ply 60 to form a slot 86 in which an upright edge portion 87 of the body of the side panel 26 is received. The opposite upright edge molding 72 (FIG. 4) is mounted in a similar manner. As shown in FIG. 12, the top edge molding 76 is mounted with a flange 80A thereof extending into a slot 90 formed between upper edge portions of the base ply 60 and the facing ply 62. The upper edge portion of the facing ply 62 is received between the flange 80A and a flange 78A of the top edge molding 76 with a flange 82A of the top edge molding 76 overlying the upper edge of the base ply 60 and a web 81A thereof overlying the upper edge of the facing ply 62. As shown in FIG. 4, an opening 92 is formed in the body of the front end panel 28 at the center line thereof spaced below the top edge molding 76. A bolt 94 (FIGS. 10, 11, 15 and 16 ) extends through the opening 92 and is received between upright arms 96 and 98 (FIG. 11) of angle-shaped wire members 43A and 43B, respectively, of the basket 38. The bolt 94 rests on a transverse arm 100 of a horizontal U-shaped wire member 42A of the basket 38. A washer 102 mounted on the bolt 94 spans the upright arms 96 and 98. A nut 104 threaded on the bolt 94 holds the front end panel 28 in position on the basket 38 of the cart structure 32. Spring supporting eyes 106 and 108 (FIG. 4) are mounted in the upright frame bar member 69. Spring supporting eyes 110 and 112 are mounted in the upright frame bar member 70. A slide bolt latch guide 114 is mounted on the upright frame bar member 69. A second slide bolt latch guide 116 is mounted on the upright frame bar member 70. Latch bolts 118 and 120 are slidably mounted in the guides 114 and 116, respectively. A track 121 (FIGS. 2 and 14) is mounted on the front end panel 28. A bracket 123 is slidably mounted in the track 121. A sign panel 125 is mounted on the bracket 123 and can carry appropriate indicia (not shown).

The side panel 26 (FIGS. 6 and 7) has a body which includes a base ply 122 and a facing ply 124 laminated to the base ply 122. A top edge molding 127 is mounted on an upper edge of the body with a flange 80B of the top edge molding 127 received in a slot (not shown) between upper edge portions of the base ply 122 and the facing ply 124 similar in manner to the mounting of the top edge molding of the front end panel 28 already described. A horizontal molding 126 is attached to the base ply 122 adjacent to but spaced below an upper edge thereof. An eye member 128 is mounted in the molding 126. A front upright molding 130 is attached to the base ply 122 adjacent to but spaced from a front edge 132 of the side panel 26. Eye members 134 and 136 are mounted in the front upright molding 130. A bolt hole 138 is formed in the front upright molding 130. A rear upright molding 140 is mounted on the base ply 122 adjacent to but spaced from a rear edge 142 of the side panel 26. A U-shaped bracket 144 is mounted on the rear upright molding 140 with a flange 146 thereof spaced from and parallel to the rear edge 142. Eye members 148 and 150 are mounted in the base ply 122 of the side panel 26. An opening 152 is formed in side panel 26 adjacent an upper rear corner thereof. The opening 152 receives a bolt 154 (FIGS. 15 and 16) which extends between upright side arms 156 and 158 of upright U-shaped wire members 40A and 40B, respectively, of the basket 38 with the bolt 154 resting on a horizontal arm 160 of the horizontal U-shaped wire member 42A. A plate 162 mounted on the bolt 154 spans the arms 156 and 158. A nut 164 on the bolt 154 holds the side panel 26 in position on the basket 38. The latch bolt 120 is extended into the opening 138 to support the front portion of the side panel 26.

The side panel 24 is similar in construction to the side panel 26, already described, but is a mirror image thereof and includes a base ply 166 (FIG. 11) and a facing ply 168. A top edge molding 170 is mounted on an upper edge portion of the side panel 24. A horizontal molding 172, a front upright molding 174 and a rear upright molding 176 (FIG. 10) are attached to an inner face of the base ply 166. Eye members 178 and 180 (FIG. 11) are mounted in the front upright molding 174. An eye member 182 (FIG. 10) is mounted in the horizontal molding 172. Eye members 184 and 186 are mounted in the base ply 166. A U-shaped bracket 188 is mounted in the rear upright molding 176. An opening 190 (FIG. 11) in the front upright molding 174 receives the latch bolt 118. An opening 192 (FIG. 10) in the side panel 24 receives a bolt 194, which is received between wire members of the basket 38, as shown in FIG. 15, to support the side panel 24 on the basket 38. A plate 196 and a nut 198 threaded on the bolt 194 hold the side panel 24 in position on the basket 38. A tension spring 200 (FIG. 11) links the eye members 136 and 180 to hold lower portions of the side panels 24 and 26 in assembled relation with side edges of the front end panel 28. A second tension spring 202 links the eye members 178 and 134 to hold upper portions of the side panels 24 and 26 in assembled relation with side edges of the front end panel 28. The side panel 26 is also held in assembled relation with the front end panel 28 by a tension spring 204 (FIG. 16), which links the eye members 112 and 148, and a tension spring 206, which links the eye members 110 and 128. Similarly, the side panel 24 is also held in assembled relation with the front end panel 28 by tension springs 208 and 210 (FIG. 10).

The rear panel 30 includes a base ply 212 and a facing ply 214 (FIG. 9). Upright edge molding strips 216 and 218 (FIG. 8) are mounted on upright edge portions 220 and 222 (FIG. 9) of the facing ply 214. A top edge molding 224 (FIG. 8) is mounted on the upper edge of the facing ply 214. An upper portion of the base ply 212 is cut away as indicated at 226 to provide space for the rear frame members 48 and 50 (FIG. 15) which support the handle 46 and end portions of a flange 80R of the top edge molding 224 are cut away as shown. Hook members 228 and 230 are mounted in the base ply 212. The lower edge of the rear panel 30 rests on the brackets 144 and 188 with lower portions of the rear edges of the side panels 24 and 26 being drawn together to engage the rear panel 30 by a tension spring 232 (FIG. 16A), which links the eye members 150 and 184. A tension spring 234 (FIG. 15) spans the hook members 228 and 230 (FIG. 8) and overlies the upright rear wire members 44 of the basket 38 as shown in FIG. 15. Screw members 236 (FIGS. 1 and 13) are mounted in the rear panel 30 and extend through slots 238, one of which is shown in FIG. 13, in a rear wall 240 of a waste receptacle 242 to support the waste receptacle 242 on the rear panel 30.

A refrigerated container unit 244 is mounted on the horizontal moldings 126 and 172 as shown in FIGS. 3, 18 and 19. The refrigerated container unit 244 includes a horizontal bottom 246, upwardly extending side walls 248 and 250 and upwardly extending end walls 252 and 254 which define an open-topped chamber 255. A plate portion 256 extends outwardly from upper edges of the side walls 248 and 250 and the end walls 252 and 254. Edge portions 257 of the plate portion are bent downwardly and terminate in inwardly extending flanges 258. Blocks 260 of thermal insulation are mounted beneath the bottom 246 and the plate portion 256 and overlying the walls 248, 250, 252 and 254. Flanges 258A and 258B underlie blocks of insulation 260A and 260B and rest on the horizontal moldings 172 and 126, respectively. The bottom 246, walls 248, 250, 252 and 254, the plate portion 256, the edge portion 257 and the flanges 258 can be unitary and can be formed of stainless steel members or the like welded together. Crushed ice or the like, not shown, can be placed in the chamber 255 resting on the bottom 246. An inverted channel-shaped support 262 of perforated metal can be mounted inside the lower portion of the chamber 255 with a web 263 thereof overlying the ice and forming a platform for supporting refrigerated articles, not shown. A lid 264 can be used to close the open top of the chamber 255. The lid 264 includes a first rectangular sheet portion 266 and a second rectangular sheet portion 267. Adjacent edges of the sheet portions 266 and 267 are received between flanges of a generally H-shaped transverse molding 269 (FIGS. 17 and 20). The sheet portion 267 can be adhesively attached to the transverse molding 269 while the sheet portion 266 can have a sliding fit therewith. Moldings 270 and 272 of C-shape in cross-section surround free edges of the sheet portions 266 and 267, respectively. An edge of a cloth tab 274 is held by the molding 270 and can be used for withdrawing the sheet portion 266 from the transverse molding 269 to raise the sheet portion 266 to a position at which the chamber 255 is open, as indicated at 266A in FIG. 18 in double-dot-dash lines.

The refrigerated cart assembly can be used in a grocery store or the like by a food sales representative or hostess who rolls the refrigerated cart assembly along the aisles of the grocery store while passing out samples. A plate or the like holding the samples can be placed on the second rectangular sheet portion 267. Food articles for sale can be stored in the chamber 255, and, if a customer wishes to make a purchase, the food articles are immediately available for selection by the customer. When the food sales representative wishes to move to another grocery store, the lid 264 and the refrigerated container unit 244 can be removed from the shopping cart and the panels 24, 26, 28 and 30 and associated springs and fittings can be dismounted from the basket 38 of the shopping cart structure for ready transfer in an automobile or the like to the other grocery store. At the other grocery store, the panels 24, 26, 28 and 30 can be reassembled on another shopping cart. The side panels 24 and 26 and the front end panel 28 are first assembled as shown in FIG. 21 and the tension springs 200, 202, 204, 206, 208 and 210 are mounted as shown to hold the panels 24, 25 and 28 in assembled relation. The latch bolts 118 and 120 (FIG. 4) are advanced to be received in the bolt holes 190 and 138 (FIG. 11), respectively. The shopping cart 32 is rolled into position as shown in dot-dash lines in FIG. 10. The panels 28, 24 and 26 are raised, and the bolts 94, 154 and 194 are set in position in the basket with assembled washers and nuts being mounted to hold the panels 24, 26 and 28 in position on the basket 32. The tension spring 232 is mounted as shown in FIG. 16A, and the rear panel 30 is mounted on the brackets 144 and 188. The tension spring 234 (FIG. 15) is mounted as shown in FIGS. 15 and 16. The refrigerated container unit 244 and the lid 264 can be set in place, and the refrigerated cart assembly is ready for use at the other grocery store.

The refrigerated cart assembly illustrated in the drawings and described above is subject to structural modification without departing from the spirit and scope of the appended claims.

Having described my invention, what I claim as new and desire to secure by letters patent is:

1. The combination of a shopping cart including a basket formed of wire members with spaces therebetween, a framework supporting the basket, and wheels supporting the framework with a pair of upright side panels, fastener means mounted on the side panels and extending through spaces in walls of the basket to rest on wire members of the basket for releasably supporting the side panels on opposite sides of the basket, a pair of upright end panels, each of the end panels spanning opposed end portions of the side panels, tension spring members extending crosswise of the shopping cart and linking the side panels to cause the side panels to engage the end panels, tension spring members extending lengthwise of the shopping cart and linking a first one of the end panels to the side panels to hold the first one of the end panels against the side panels, a tension spring member attached at its ends to a second one of the end panels and overlying a handle portion of the shopping cart to hold the second one of the end panels against the side panels, a refrigerated container including a central cup-shaped portion and outwardly extending horizontal flange portions, and support means mounted on the side panels, the flange portions overlying the support means to support the refrigerated container with the cup-shaped portion extending into the interior of the basket.

2. A combination as in claim 1 wherein the support means includes horizontal moldings mounted on inner faces of the side panels and the outwardly extending flange portions are supported by the moldings.

* * * * *